(12) United States Patent
Chang

(10) Patent No.: US 7,895,925 B2
(45) Date of Patent: Mar. 1, 2011

(54) CLAMPING DEVICE FOR ANCHORING A MICROPHONE TO AN INSTRUMENT

(75) Inventor: Chao-Chih Chang, Taichung (TW)

(73) Assignee: Taiwan Carol Electronics Co., Ltd., Taichung (TW)

( * ) Notice: Subject to any disclaimer, the term of this patent is extended or adjusted under 35 U.S.C. 154(b) by 369 days.

(21) Appl. No.: 12/244,482

(22) Filed: Oct. 2, 2008

(65) Prior Publication Data

US 2010/0001154 A1 Jan. 7, 2010

(51) Int. Cl.
*B25B 7/12* (2006.01)
(52) U.S. Cl. ............................ 81/302; 81/318; 269/6; 269/3
(58) Field of Classification Search ............ 248/316.7, 248/316.1, 231.81, 231.51, 316.5; 81/301, 81/318, 326, 327; 269/3, 6, 71, 95
See application file for complete search history.

(56) References Cited

U.S. PATENT DOCUMENTS

| 419,272 | A | * | 1/1890 | Low | 81/327 |
| 652,404 | A | * | 6/1900 | Sharp | 81/341 |
| 797,541 | A | * | 8/1905 | Waler et al. | 12/117.2 |
| 1,319,007 | A | * | 10/1919 | Kind | 29/223 |
| 2,792,622 | A | * | 5/1957 | Wurzel | 29/229 |
| 3,654,755 | A | * | 4/1972 | Bell | 57/23 |
| 3,677,129 | A | * | 7/1972 | Lyon | 84/453 |
| 6,665,919 | B1 | * | 12/2003 | Kurtz et al. | 29/262 |
| 2006/0208407 | A1 | * | 9/2006 | Wang | 269/6 |

* cited by examiner

*Primary Examiner*—Kimberly T Wood
(74) *Attorney, Agent, or Firm*—Holland & Hart, LLP

(57) ABSTRACT

A clamping device includes an elongated seat unit and a clamping lever unit which respectively have mated and mating jaw segments to clamp a to-be-clamped part of an instrument, grip and actuating segments confronting each other, and mount and fulcrum segments pivotally mounted such that, when the actuating segment is turned away from the grip segment, the mating and mated jaw segments are moved toward each other. A lengthwise extending beam is secured to the elongated seat unit, and is spaced apart from the grip segment. A tubular member has an inner peripheral retained surface displaceably engaged with the beam, and an outer rim surface configured to force the actuating segment to permit the mating jaw segment to clamp the to-be-clamped part with an increased friction force when the tubular member is displaced towards the mount segment.

10 Claims, 6 Drawing Sheets

CLAMPING DEVICE FOR ANCHORING A MICROPHONE TO AN INSTRUMENT

BACKGROUND OF THE INVENTION

1. Field of the Invention

This invention relates to a clamping device for anchoring a microphone to an instrument, more particularly to a clamping device used for firmly anchoring a microphone to different types of musical instruments.

2. Description of the Related Art

Referring to FIG. 1, a conventional clamping device 100 for anchoring a microphone 10 to a musical instrument, such as a bell flare 14 of a brass wind instrument, is shown to include a first jaw 11, a second jaw 12 and a tightening unit 13. The first and second jaws 11, 12 are used to clamp the bell flare 14 therebetween so as to attach the microphone 10 to the bell flare 14. The tightening unit 13 includes a threaded bolt 131 which passes through the first jaw 11, and a rotary handle 132 which is operable manually to move the first jaw 11 relative to the second jaw 12 so as to permit the microphone 10 to be attached to or released from the bell flare 14.

Since the threaded bolt 131 and the rotary handle 132 extend outwardly of the first jaw 11 and in a direction transverse to the extending direction of the first and second jaws 11,12, the threaded bolt 131 has to be moved outwardly from the second jaw 12 by a relatively large distance when it is desired to release the tightening unit 13, which is inconvenient and time-consuming during operation. Moreover, the threaded bolt 131 may become loosened and easily misplaced. In addition, the exposed threaded bolt 131 and rotary handle 132 adversely affect the outer appearance of the clamping device 100.

SUMMARY OF THE INVENTION

An object of the present invention is to provide a clamping device which can firmly anchor a microphone to different types of instruments and which has an improved outer appearance.

According to this invention, the clamping device includes an elongated seat unit which has a mated jaw segment, a grip segment, and a mount segment interposed therebetween. The mated jaw segment has a mated clamping surface adapted to engage a to-be-clamped part of an instrument. A clamping lever unit includes a mating jaw segment, an actuating segment, and a fulcrum segment interposed therebetween. The mating jaw segment has a mating clamping surface confronting the mated clamping surface. The actuating segment has an abutment wall confronting the grip segment. The fulcrum segment is pivotally mounted on the mount segment such that, when the actuating segment is turned away from the grip segment, the mating clamping surface is moved towards the mated clamping surface. A biasing member is disposed to bias the mating jaw segment to move the mating clamping surface towards the mated clamping surface to thereby hold the to-be-clamped part therebetween. A beam is secured to the elongated seat unit, and is spaced apart from the grip segment. The beam extends along a lengthwise axis and has a retaining segment proximate to the mount segment. A tubular member is mounted to be displaceable incrementally relative to the retaining segment along the lengthwise axis so as to move to a selected one of displaced positions. The tubular member has an inner peripheral retained surface engaged with the retaining segment to guard against movement out of the selected one of the displaced positions, and an outer rim surface configured such that, when the tubular member is displaced towards the mount segment, the outer rim surface is brought to force the abutment wall so as to permit the mating clamping surface to clamp the to-be-clamped part in a tightened position with an increased friction force, and to firmly hold the to-be-clamped part in the tightened position by virtue of counteraction between the increased friction force and the retaining force.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
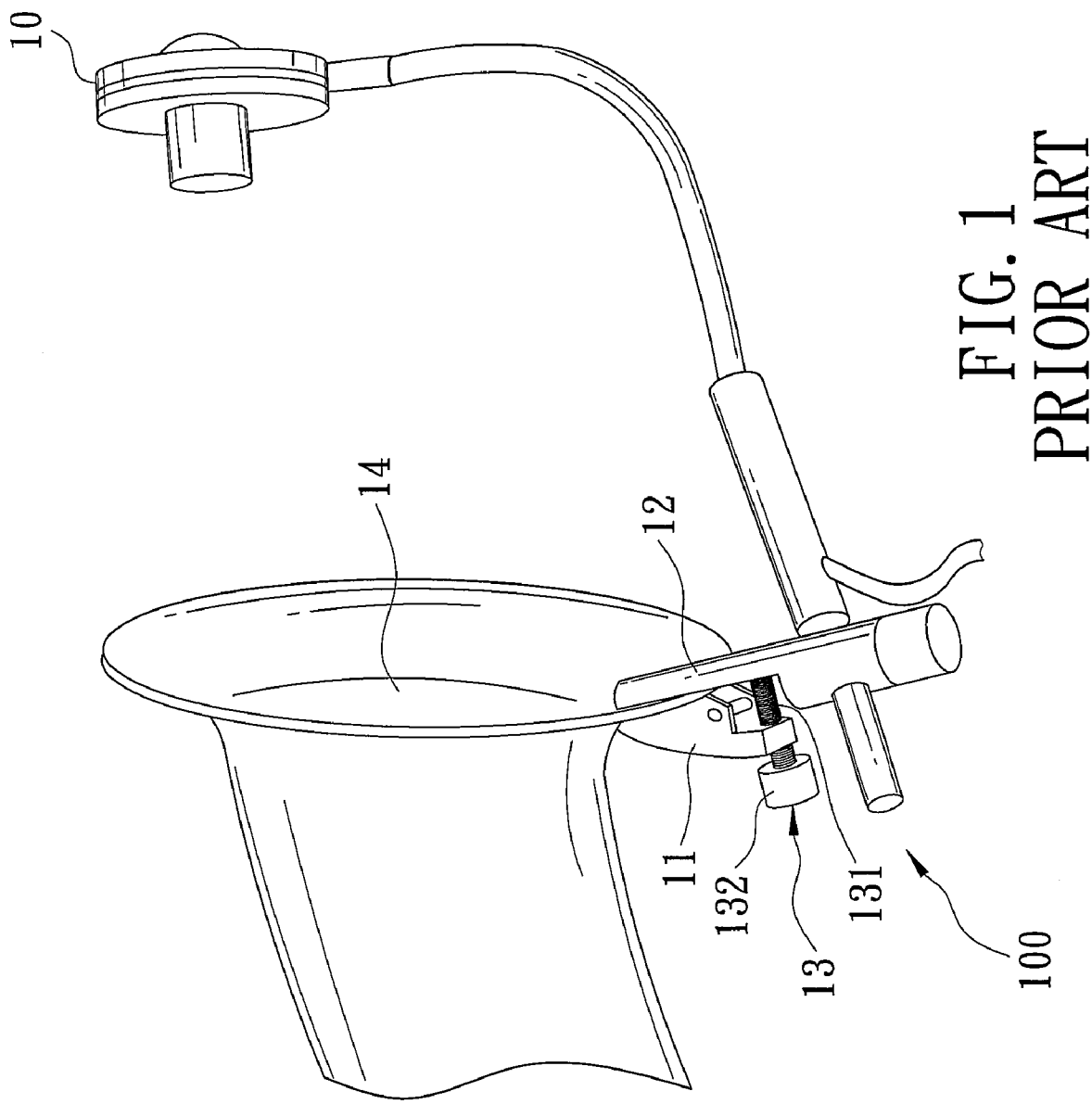
FIG. 1 is a perspective view of a conventional clamping device for anchoring a microphone to a musical instrument.

Before the present invention is described in greater detail, it should be noted that same reference numerals have been used to denote like elements throughout the specification.

Figure 2:
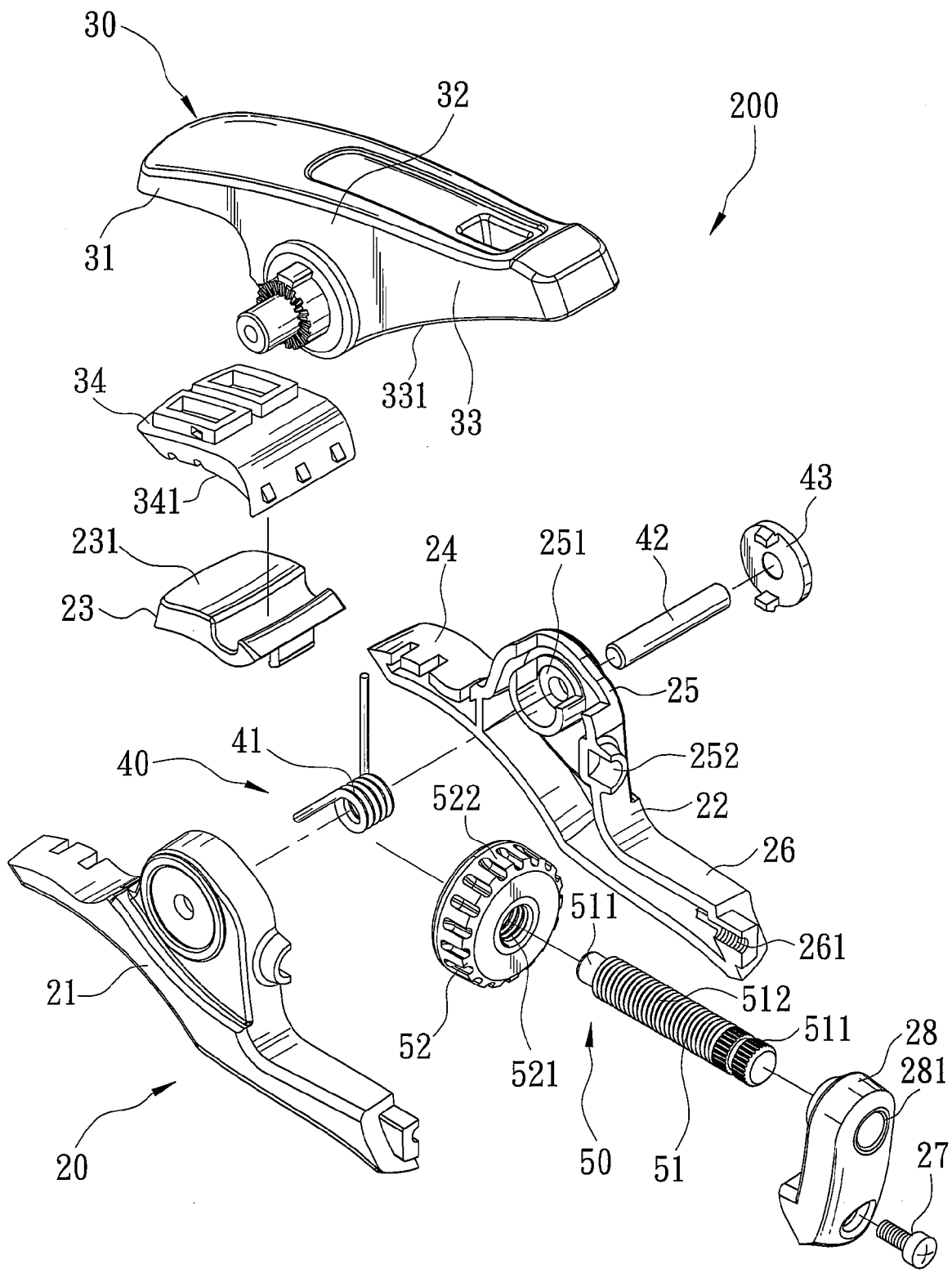
FIG. 2 is an exploded perspective view of the first preferred embodiment of a clamping device according to this invention.
Figure 3:
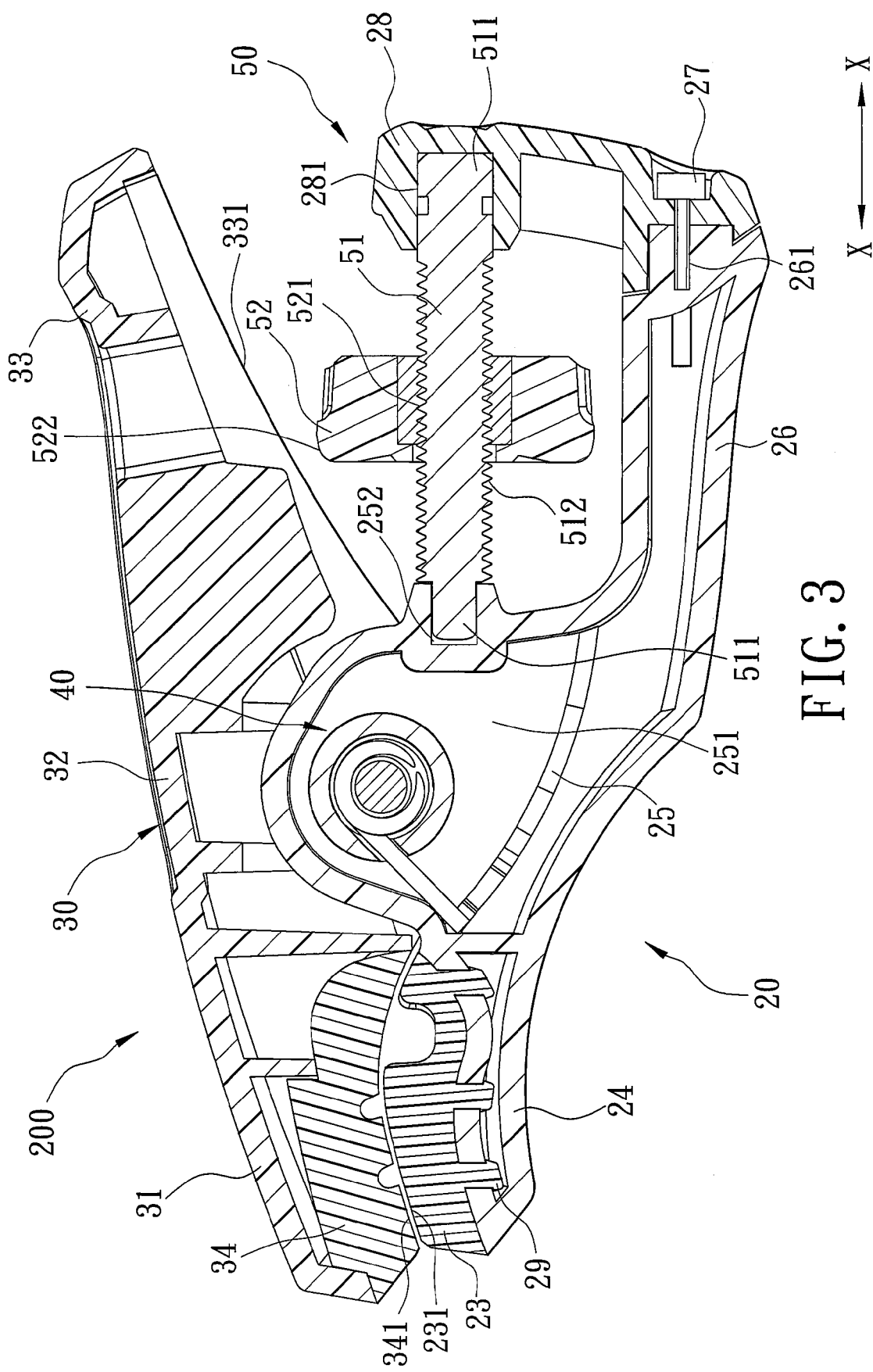
FIG. 3 is a sectional view of the first preferred embodiment when a tubular member is in a releasable position.

Referring to FIGS. 2 and 3, the first preferred embodiment of a clamping device 200 according to the present invention is shown to comprise an elongated seat unit 20, a clamping lever unit 30, a biasing member 40, and a tightening unit 50.

The elongated seat unit 20 includes two shell halves 21, 22 which are configured to confront and which are coupled with each other in a first transverse direction (Y) to form a mated jaw segment 24, a grip segment 26 opposite to the mated jaw segment 24 in a longitudinal direction (X) transverse to the first transverse direction, and a mount segment 25 interposed between the mated jaw segment 24 and the grip segment 26. The shell halves 21, 22 cooperatively define a compartment 251 and an insertion hole 281 in the mount segment 25, and a threaded hole 261 in the grip segment 26.

A lower claw block 23 is made from a deformable friction material, and is disposed securely on the coupled mated jaw segment 24 by virtue of a mortise-and-tenon joint 29 that is disposed between a bottom side of the lower claw block 23 and the mated jaw segment 24 such that the lower claw block 23 has an upper surface serving as a mated clamping surface 231 which extends in the first transverse direction (Y) for engaging a to-be-clamped part of a musical instrument.

The elongated seat unit 20 further includes a mounting post 28 which is secured to the grip segment 26 by a screw 27 that engages the threaded hole 261, and which extends in a second transverse direction transverse to the first transverse direction (Y) and the longitudinal direction (X) to terminate at a mounting end. The mounting end has an insertion hole 281 confronting the insertion hole 252 in the longitudinal direction (X).

The clamping lever unit 30 includes a mating jaw segment 31, an actuating segment 33 opposite to the mating jaw segment 31 in the longitudinal direction (X), and a fulcrum segment 32 interposed between the mating jaw segment 31 and the actuating segment 33. An upper claw block 34 is made from a deformable friction material, and is detachably fitted to and mounted on the mating jaw segment 31. The upper claw block 34 has a lower surface serving as a mating clamping surface 341 confronting the mated clamping surface 231 in the second transverse direction.

The actuating segment 33 has an abutment wall 331 confronting the grip segment 26 in the second transverse direction.

The fulcrum segment 32 is aligned with the mount segment 25 along a pivot axis in the first transverse direction (Y), and is pivotally mounted on the mount segment 25 about the pivot axis such that, when the actuating segment 33 is turned away from the grip segment 26, the mating clamping surface 341 is moved towards the mated clamping surface 231. A microphone (not shown) is adapted to be connected to the fulcrum segment 32 on a side opposite to the mount segment 25.

The biasing member 40 includes a torsion spring 41 which is received in the compartment 251 and which has two ends abutting against the mount and fulcrum segments 25, 32, respectively, so as to bias the mating jaw segment 31 to move the mating clamping surface 341 towards the mated clamping surface 231 to thereby hold the to-be-clamped part therebetween. Preferably, a pivot shaft 42 extends through the mountand fulcrum segments 25, 32 and the torsion spring 41 along the pivot axis. An end cap 43 is provided to cover an end of the pivot shaft 42.

The tightening unit 50 includes a beam 51 and a tubular member 52. The beam 51 has two inserting ends 511 which are respectively engaged in the insertion holes 252, 281 to thereby secure the beam 51 to the elongated seat unit 20 and to thereby permit the beam 51 to be spaced apart from the grip segment 26, and a retaining segment 512 interposed between the inserting ends 511 and extending along a lengthwise axis in the longitudinal direction. In this embodiment, the retaining segment 512 has external threads.

The tubular member 52 has an inner peripheral retained surface 521 with internal threads for engaging the external threads of the retaining segment 512 such that the tubular member 52 is displaceable incrementally relative to the retaining segment 512 along the lengthwise axis so as to move to a selected one of displaced positions when being rotated, and such that, by virtue of a retaining force generated as a result of engagement between the inner peripheral retained surface 521 and the retaining segment 512, the tubular member 52 is guarded against movement out of the selected one of the displaced positions.

Figure 4:
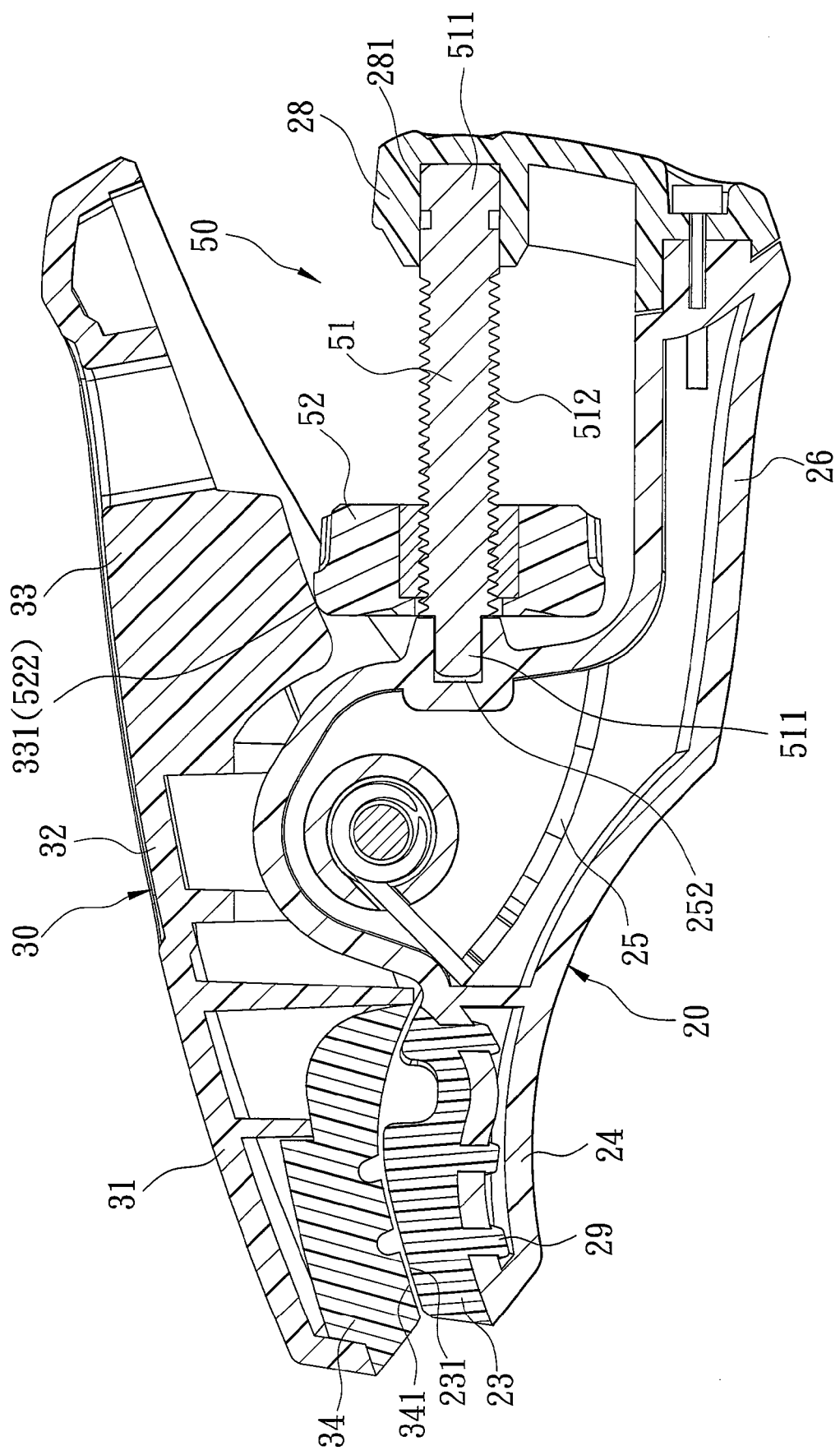
FIG. 4 is a sectional view of the first preferred embodiment when a tubular member is in a tightened position.

The tubular member 52 further has an outer rim surface 522 which is opposite to the inner peripheral retained surface 521 in radial directions, and which is configured such that, referring to FIG. 4, when the tubular member 52 is turned towards the pivot axis, the outer rim surface 522 is brought to force the abutment wall 331 of the actuating segment 33 to turn about the pivot axis further so as to permit the mating clamping surface 341 to clamp the to-be-clamped part in a tightened position with an increased friction force, and to firmly hold the to-be-clamped part in the tightened position by virtue of counteraction between the increased friction force and the retaining force.

As illustrated, since the tightening unit 50 is disposed between the actuating segment 33 and the grip segment 26, and since the tubular member 52 is kept in engagement with the beam 51 during displacement, misplacement of the tubular member 52 is prevented, and the outer appearance of the clamping device is improved. In addition, by means of the tightening unit 50, the clamping device 100 can be used for firmly anchoring a microphone to different types of musical instruments with an anchored edge of different dimensions.

Figure 5:
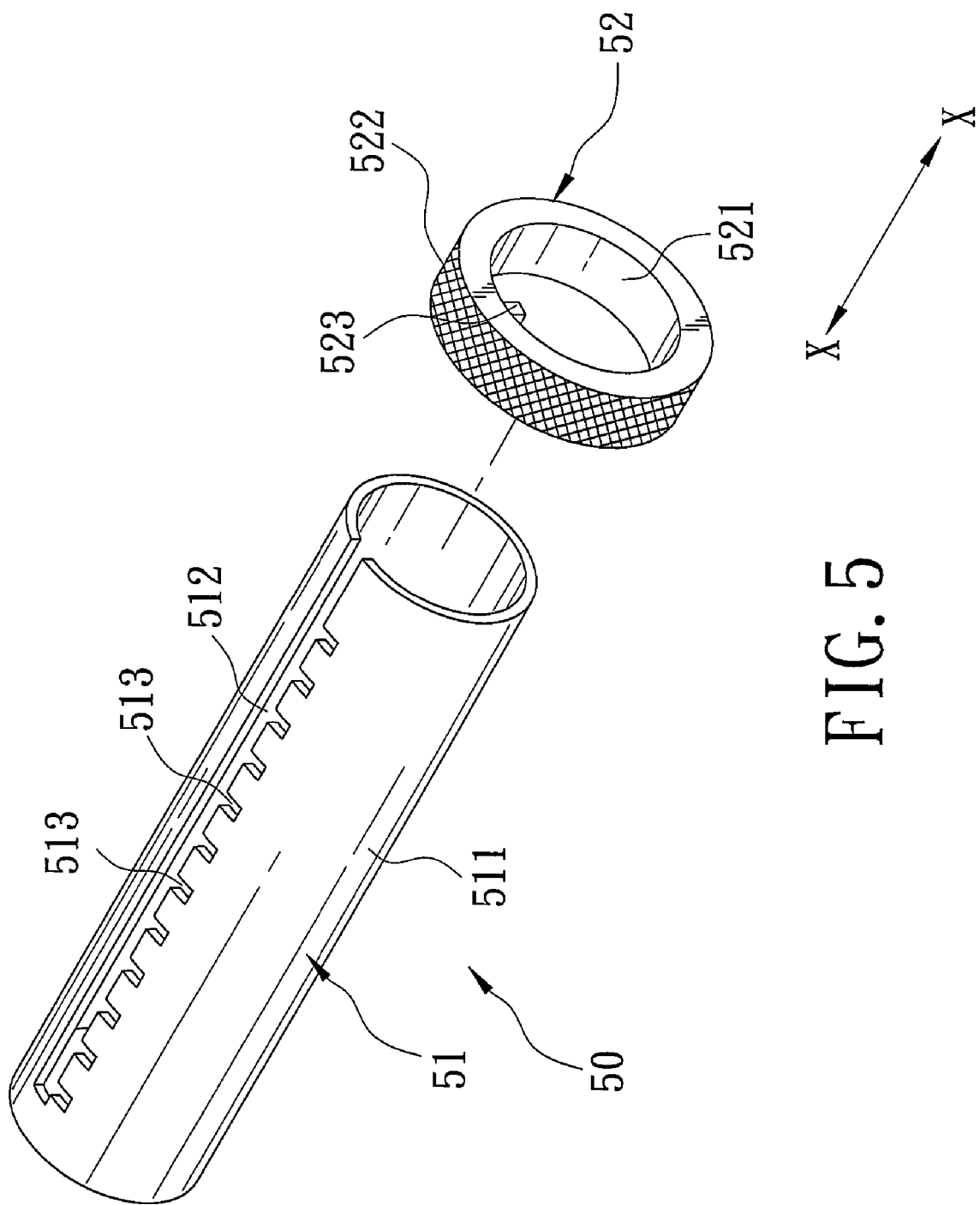
FIG. 5 is an exploded perspective view of a portion of the second preferred embodiment of a clamping device according to this invention.

The second preferred embodiment of a clamping device according to this invention is similar to the first embodiment in construction, except that, referring to FIG. 5, the beam 51 of the tightening unit 50 is a tubular cylinder, and has a guiding slot 512 extending along the lengthwise axis, and a plurality of retaining grooves 513 which are displaced from one another by a predetermined distance along the longitudinal direction, and which extend respectively and transversely to be communicated with the guiding slot 512 so as to define the displaced positions. In addition, the tubular member 52 according to this embodiment has a retaining key 523 which extends from the inner peripheral retained surface 521 towards the lengthwise axis and which is disposed to be guided in the guiding slot 512. Thus, after the tubular member 52 is moved to bring the outer rim surface 522 to abut against the abutment wall 331 (see FIG. 4), the tubular member 52 is turned about the lengthwise axis to engage the retaining key 523 in a selected one of the retaining grooves 513 with the retaining force so as to guard the tubular member 52 against movement out of the selected one of the displaced positions.

Figure 6:
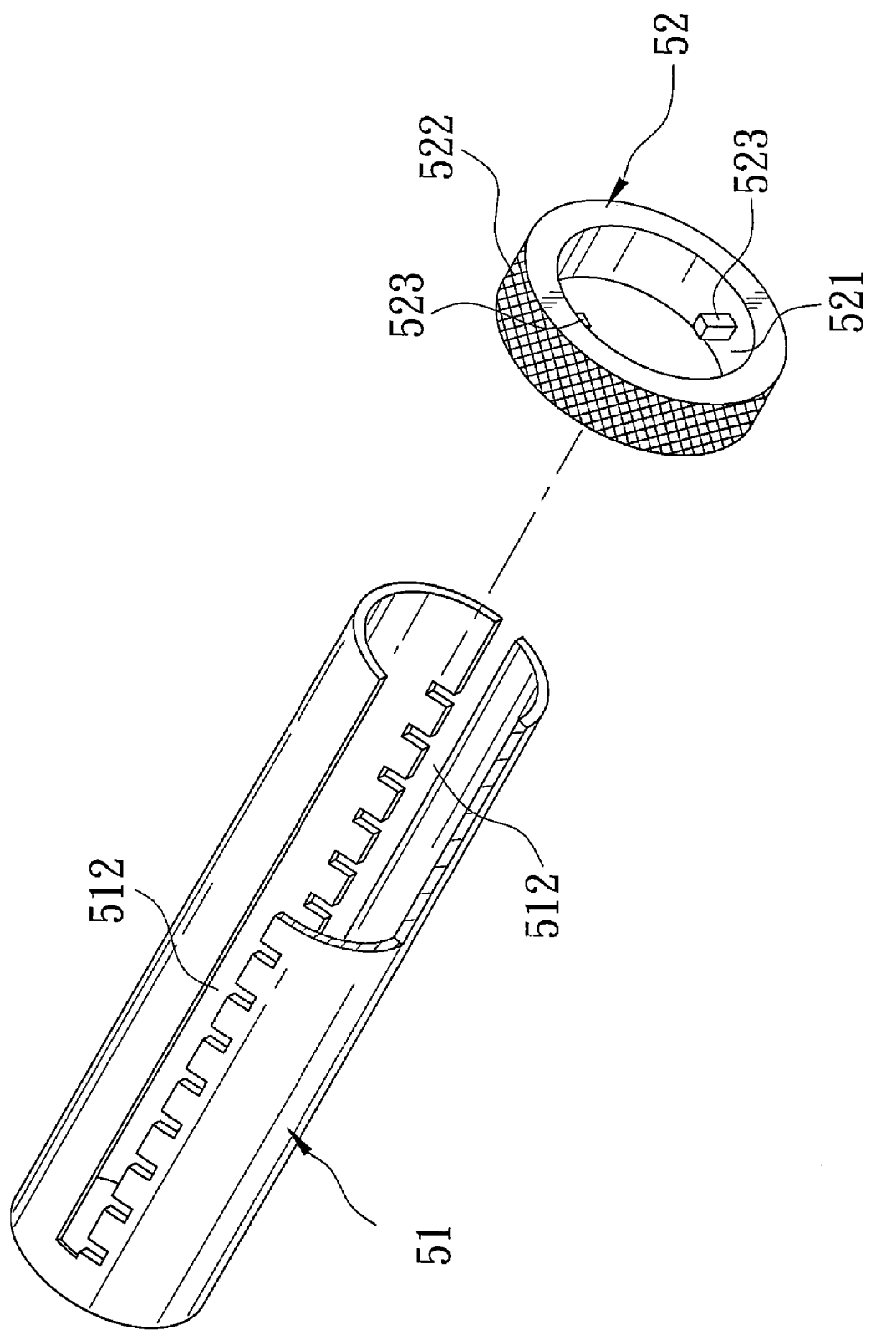
FIG. 6 is an exploded perspective view of a portion of the third preferred embodiment of a clamping device according to this invention.

Alternatively, referring to FIG. 6, in the third preferred embodiment of a clamping device according to this invention, the beam 51 has a plurality of guiding slots 512 angularly spaced apart from each other, and the tubular member 52 has a plurality of retaining keys 523 respectively guided in the guiding slots 512 so as to facilitate sliding movement of the tubular member 52 along the beam 51.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A clamping device used for firmly anchoring a microphone to different types of instruments, comprising:
    an elongated seat unit which has a mated jaw segment and a grip segment opposite to each other in a longitudinal direction, and a mount segment interposed between said mated jaw segment and said grip segment, said mated jaw segment having a mated clamping surface which extends in a first direction transverse to the longitudinal direction, and which is adapted to engage a to-be-clamped part of the instrument;
    a clamping lever unit including
        a mating jaw segment having a mating clamping surface which confronts said mated clamping surface in a second direction transverse to both the longitudinal direction and the first transverse direction,
        an actuating segment which is opposite to said mating jaw segment in the longitudinal direction, and which has an abutment wall confronting said grip segment in the second transverse direction, and
        a fulcrum segment which is interposed between said mating jaw segment and said actuating segment, and which is pivotally mounted on said mount segment about a pivot axis in the first transverse direction such that, when said actuating segment is turned away from said grip segment, said mating clamping surface is moved towards said mated clamping surface;
    a biasing member disposed to bias said mating jaw segment to move said mating clamping surface towards said mated clamping surface to thereby hold the to-be-clamped part therebetween;

a beam which is secured to said elongated seat unit, and which is disposed to be spaced apart from said grip segment, said beam extending along a lengthwise axis in the longitudinal direction, and having a retaining segment proximate to said mount segment; and a tubular member mounted to be displaceable incrementally relative to said retaining segment along the lengthwise axis so as to move to a selected one of displaced positions, and having an inner peripheral retained surface engaged with said retaining segment by virtue of a retaining force which guards said tubular member against movement out of the selected one of the displaced positions, and an outer rim surface which is opposite to said inner peripheral retained surface in radial directions, which is configured such that, when said tubular member is displaced towards the pivot axis, said outer rim surface is brought to force said abutment wall of said actuating segment to turn about the pivot axis further so as to permit said mating clamping surface to clamp the to-be-clamped part in a tightened position with an increased friction force, and to firmly hold the to-be-clamped part in the tightened position by virtue of counteraction between the increased friction force and the retaining force.

2. The clamping device according to claim 1, wherein said elongated seat unit further includes a mounting post which extends from said grip segment towards said actuating segment and which terminates at a mounting end, said beam being mounted on said mounting end, and extending towards said mount segment along the lengthwise axis such that said retaining segment is disposed proximate to said mount segment.

3. The clamping device according to claim 2, wherein said mounting end and said mounting segment respectively have insertion holes confronting each other in the longitudinal direction such that said beam has two inserting ends which are on two opposite sides of said retaining segment and which are respectively engaged in said insertion holes, thereby securing said beam to said elongated seat unit.

4. The clamping device according to claim 3, wherein said retaining segment of said beam and said inner peripheral retained surface of said tubular member respectively have external and internal threads engaged with each other by virtue of the retaining force.

5. The clamping device according to claim 1, wherein said elongated seat unit includes two shell halves which are configured to confront and which are coupled with each other in the first transverse direction to form said mated jaw, grip and mount segments, and a lower claw block which is disposed on said mated jaw segment to serve as said mated clamping surface, said clamping device further comprising a mortise-and-tenon joint disposed between a bottom side of said lower claw block and said mated jaw segment to secure said lower claw block to said mated jaw segment.

6. The clamping device according to claim 5, wherein said shell halves cooperatively define a compartment in said mount segment, said biasing member being a torsion spring which is received in said compartment and which has two ends abutting against said mount and fulcrum segments, respectively.

7. The clamping device according to claim 6, wherein said mount and fulcrum segments are aligned with each other along the pivot axis, said clamping device further comprising a pivot shaft which extends through said mount and fulcrum segments and said torsion spring along the pivot axis such that said actuating segment is turnable relative to said grip segment.

8. The clamping device according to claim 5, wherein said clamping lever unit further includes an upper claw block which is detachably fitted to, and which is mounted on, said mating jaw segment to serve as said mating clamping surface.

9. The clamping device according to claim 8, wherein said upper and lower claw blocks are made from a deformable friction material.

10. The clamping device according to claim 2, wherein said retaining segment of said beam is of a cylindrical shape, and has a guiding slot extending along the lengthwise axis, and a plurality of retaining grooves which are displaced from one another by a predetermined distance along the longitudinal direction, and which extend respectively and transversely to be communicated with said guiding slot so as to define the displaced positions, said tubular member has a retaining key which extends from said inner peripheral retained surface towards the lengthwise axis and which is disposed to be guided in said guiding slot such that, after said tubular member is moved to bring said outer rim surface to abut against said abutment wall, said tubular member is turned about the lengthwise axis to engage said retaining key in a selected one of said retaining grooves with the retaining force so as to guard said tubular member against movement out of the selected one of the displaced positions.

* * * * *